US010620165B2

(12) United States Patent
Tumpold et al.

(10) Patent No.: US 10,620,165 B2
(45) Date of Patent: Apr. 14, 2020

(54) PHOTOACOUSTIC GAS ANALYZER FOR DETERMINING SPECIES CONCENTRATIONS USING INTENSITY MODULATION

(71) Applicant: Infineon Technologies AG, Neuibiberg (DE)

(72) Inventors: David Tumpold, Kirchheim (DE); Gueclue Onaran, Munich (DE); Christoph Glacer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 170 days.

(21) Appl. No.: 15/393,342

(22) Filed: Dec. 29, 2016

(65) Prior Publication Data

US 2018/0188213 A1 Jul. 5, 2018

(51) Int. Cl.
 *G01N 29/24* (2006.01)
 *G01N 21/17* (2006.01)
 *G01N 29/032* (2006.01)

(52) U.S. Cl.
 CPC ..... *G01N 29/2425* (2013.01); *G01N 21/1702* (2013.01); *G01N 29/032* (2013.01);
 (Continued)

(58) Field of Classification Search
 CPC ....... G01N 21/1702; G01N 2021/1704; G01N 2021/1708; G01N 29/2425; G01N 29/2418; G01N 29/032; A61B 5/0095
 (Continued)

(56) References Cited

U.S. PATENT DOCUMENTS 2,462,946 A * 3/1949 Coggeshall ........ G01N 21/3577
 196/132
4,051,371 A * 9/1977 Dewey, Jr. .............. G01J 3/433
 250/339.09

(Continued)

OTHER PUBLICATIONS

Saarela, Wavelength modulation waveforms in laser photoacoustic spectroscopy, Feb. 2009 / vol. 48, No. 4 / Applied Optics (Year: 2009).*

(Continued)

*Primary Examiner* — Randy W Gibson
*Assistant Examiner* — David L Singer
(74) *Attorney, Agent, or Firm* — Viering, Jentschura & Partner mbB

(57) ABSTRACT

A photoacoustic gas analyzer including a gas chamber to receive a gas sample, a radiation source to emit an electromagnetic radiation adapted to excite N different types of gas molecules in the gas sample, the concentrations of which are to be determined, an acoustic-wave sensor to detect acoustic waves generated by the irradiated gas, and a control unit. The control unit controls the radiation source to emit electromagnetic radiation with a time-varying intensity and to modulate the frequency at which the intensity is varied with a modulation signal having at least N different values, to receive from the acoustic-wave sensor signals indicative of acoustic waves generated by the irradiated gas, to determine at least N mutually different signal amplitudes each associated with a respective N mutually different frequencies at which the intensity of the emitted electromagnetic radiation is varied, and to determine the concentrations of the N different gas types.

21 Claims, 11 Drawing Sheets

(52) U.S. Cl.
CPC ........... *G01N 2021/1704* (2013.01); *G01N 2021/1708* (2013.01); *G01N 2201/0691* (2013.01); *G01N 2291/021* (2013.01); *G01N 2291/02809* (2013.01)

(58) Field of Classification Search
USPC .................... 73/24.02; 356/437; 250/343
See application file for complete search history.

(56) References Cited

U.S. PATENT DOCUMENTS

| | | | | |
|---|---|---|---|---|
| 4,051,372 A * | 9/1977 | Aine | ............... | B01D 53/22 250/255 |
| 4,197,009 A * | 4/1980 | Berry | ............... | G01J 3/44 356/301 |
| 4,326,807 A * | 4/1982 | Zochbauer | ............ | G01N 21/33 250/343 |
| 4,535,241 A * | 8/1985 | Eberhardt | ............ | G01N 21/39 250/338.5 |
| 4,818,882 A * | 4/1989 | Nexo | ............... | G01N 21/1702 250/343 |
| 5,159,411 A * | 10/1992 | Hammerich | ....... | G01N 21/1702 356/432 |
| 5,616,826 A * | 4/1997 | Pellaux | ............ | G01N 21/1702 250/343 |
| 5,753,797 A * | 5/1998 | Forster | ............ | G01N 21/1702 250/343 |
| 5,841,017 A * | 11/1998 | Baraket | ............ | G01N 21/1702 73/1.59 |
| 5,913,234 A * | 6/1999 | Julliard | ............ | G01N 21/1702 250/339.13 |
| 5,933,245 A * | 8/1999 | Wood | ............... | G01N 21/1702 356/246 |
| 7,958,771 B2 * | 6/2011 | Rezachek | .......... | G01N 21/1702 73/24.02 |
| 9,696,283 B1 * | 7/2017 | Yu | ............ | G01N 29/02 |
| 2006/0139646 A1 * | 6/2006 | DiFoggio | ............... | E21B 49/10 356/436 |
| 2006/0256339 A1 * | 11/2006 | Lowney | ............ | G01N 21/1702 356/432 |
| 2007/0197886 A1 * | 8/2007 | Naganuma | ........... | A61B 5/0095 600/322 |
| 2008/0073536 A1 * | 3/2008 | Willing | ............ | G01N 21/1702 250/343 |
| 2008/0127715 A1 * | 6/2008 | Kosterev | ............ | G01N 21/1702 73/24.02 |
| 2009/0009769 A1 * | 1/2009 | Uber | ................. | G01N 21/1702 356/437 |
| 2009/0038375 A1 * | 2/2009 | Breuer | .............. | G01N 21/1702 73/24.02 |
| 2009/0249861 A1 * | 10/2009 | Van Dijk | .......... | G01N 21/1702 73/24.02 |
| 2009/0288474 A1 * | 11/2009 | Kalkman | ............. | A61B 5/0095 73/24.02 |
| 2010/0027012 A1 * | 2/2010 | Fritz | ................. | G01N 21/1702 356/432 |
| 2010/0045991 A1 * | 2/2010 | Miklos | .............. | G01N 21/1702 356/432 |
| 2011/0296900 A1 * | 12/2011 | Thorson | ............. | G01N 21/1702 73/24.02 |
| 2012/0103065 A1 * | 5/2012 | Muehleisen | ............. | G01J 3/18 73/24.02 |
| 2012/0318041 A1 * | 12/2012 | Youngner | ........ | G01N 21/1702 73/24.02 |
| 2014/0049770 A1 * | 2/2014 | Li | ....................... | A61B 5/0095 356/40 |
| 2015/0101395 A1 * | 4/2015 | Dehe | ................. | G01N 29/2418 73/24.02 |
| 2015/0211983 A1 * | 7/2015 | Speck | ............... | G01N 21/1702 73/152.18 |
| 2015/0238091 A1 * | 8/2015 | Iyer | ..................... | A61B 5/0095 600/407 |
| 2016/0058290 A1 * | 3/2016 | Nakatsuka | ............. | A61B 5/742 600/407 |
| 2016/0282259 A1 * | 9/2016 | Kolb | .................... | G01N 29/022 |
| 2016/0356700 A1 * | 12/2016 | Rouxel | ............. | G01N 29/2418 |
| 2018/0284012 A1 * | 10/2018 | Marta | ............. | G01N 21/3504 |

OTHER PUBLICATIONS

Arizona State University, Mechanism for the Absorption of Light (Year: 2015).*
The Free Dictionary, definition of flashlamp (Year: 2016).*
Professor Jya-Wei Cheng, Beer-Lambert Law (Year: 2015).*
Khan Academy, Light: Electromagnetic waves, the electromagnetic spectrum and photons (Year: 2016).*
Keith Gibbs, Intensity and Amplitude, schoolphysics (Year: 2013).*
UC Regents, Universe of Light: What is the Amplitude of a Wave? (Year: 1996).*
Patimisco et al, Purely wavelength- and amplitude-modulated quartz-enhanced photoacoustic spectroscopy, vol. 24, No. 23 | Nov. 14, 2016 | Optics Express 25943 (Year: 2016).*

* cited by examiner

PHOTOACOUSTIC GAS ANALYZER FOR DETERMINING SPECIES CONCENTRATIONS USING INTENSITY MODULATION

TECHNICAL FIELD

Various embodiments relate generally to a photoacoustic gas analyzer and to a method of operating a photoacoustic gas analyzer.

BACKGROUND

Photoacoustic gas analyzers provide a simple way of analyzing the composition of gases. Since the analysis of the composition of ambient air, e.g., due to pollution, is becoming increasingly important, it is desirable to provide a photoacoustic gas analyzer with a simple structure capable of analyzing the composition of gases in a highly efficient manner.

SUMMARY

According to various embodiments, a photoacoustic gas analyzer is provided. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to control the radiation source to emit electromagnetic radiation with a time-varying intensity and to modulate the frequency at which the intensity is varied with a modulation signal taking on at least N mutually different values, to receive from the acoustic-wave sensor signals indicative of detected acoustic waves generated by the electromagnetic radiation emitted by the radiation source into the gas to be analyzed, to determine at least N mutually different signal amplitudes associated with respective N mutually different frequencies at which the intensity of the emitted electromagnetic radiation is varied, and to determine from the determined signal amplitudes the concentrations of the N mutually different gas types.

According to various embodiments, a method of operating a photoacoustic gas analyzer is provided. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to control the radiation source to emit electromagnetic radiation with a time-varying intensity and to modulate the frequency at which the intensity is varied with a modulation signal taking on at least N mutually different values, to receive from the acoustic-wave sensor signals indicative of detected acoustic waves generated by the electromagnetic radiation emitted by the radiation source, to determine at least N mutually different signal amplitudes associated with respective N mutually different frequencies at which the intensity of the emitted electromagnetic radiation is varied, and to determine from the determined signal amplitudes the concentrations of the N mutually different gas types. The method may include: controlling the radiation source to emit into the gas chamber electromagnetic radiation with a time-varying intensity and modulating the frequency at which the intensity is varied with a modulation signal taking on at least N mutually different values, receiving from the acoustic-wave sensor signals indicative of detected acoustic waves generated by the electromagnetic radiation emitted by the radiation source, determining at least N mutually different signal amplitudes associated with respective N mutually different frequencies at which the intensity of the emitted electromagnetic radiation is varied, and determining from the determined signal amplitudes the concentrations of the N mutually different gas types.

According to various embodiments, a photoacoustic gas analyzer is provided. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, the radiation source being operable in N mutually different modes, each mode being characterized by a unique emission spectrum different from the spectra of the other N−1 modes, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to operate the radiation source in the N mutually different modes in which the radiation source is respectively operated such as to emit electromagnetic radiation with a time-varying intensity, to receive in each mode from the acoustic-wave sensor signals indicative of detected acoustic waves generated by the electromagnetic radiation emitted by the radiation source into the gas to be analyzed, and to determine from the signals received in each mode the concentrations of the N mutually different gas types.

According to various embodiments a method of operating a photoacoustic gas analyzer is provided. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, the radiation source being operable in N mutually different modes, each mode being characterized by a unique emission spectrum different from the spectra of the other N−1 modes, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to operate the radiation source in the N mutually different modes in which the radiation source is respectively operated such as to emit electromagnetic radiation with a time-varying intensity, to receive in each mode from the acoustic-wave sensor signals indicative of detected acoustic waves generated by the electromagnetic radiation emitted by the radiation source into the gas to be analyzed, and to determine from the signals received in each mode the concentrations of the N mutually different gas types. The method may include: operating the radiation source in the N mutually different modes such as to emit electromagnetic radiation with a time-varying intensity, receiving in each mode from the acoustic-wave sensor signals indicative of detected acoustic waves generated by the electromagnetic radiation emitted by the radiation source into the gas to be analyzed, and determining from the signals received in each mode the concentrations of the N mutually different gas types.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1A:
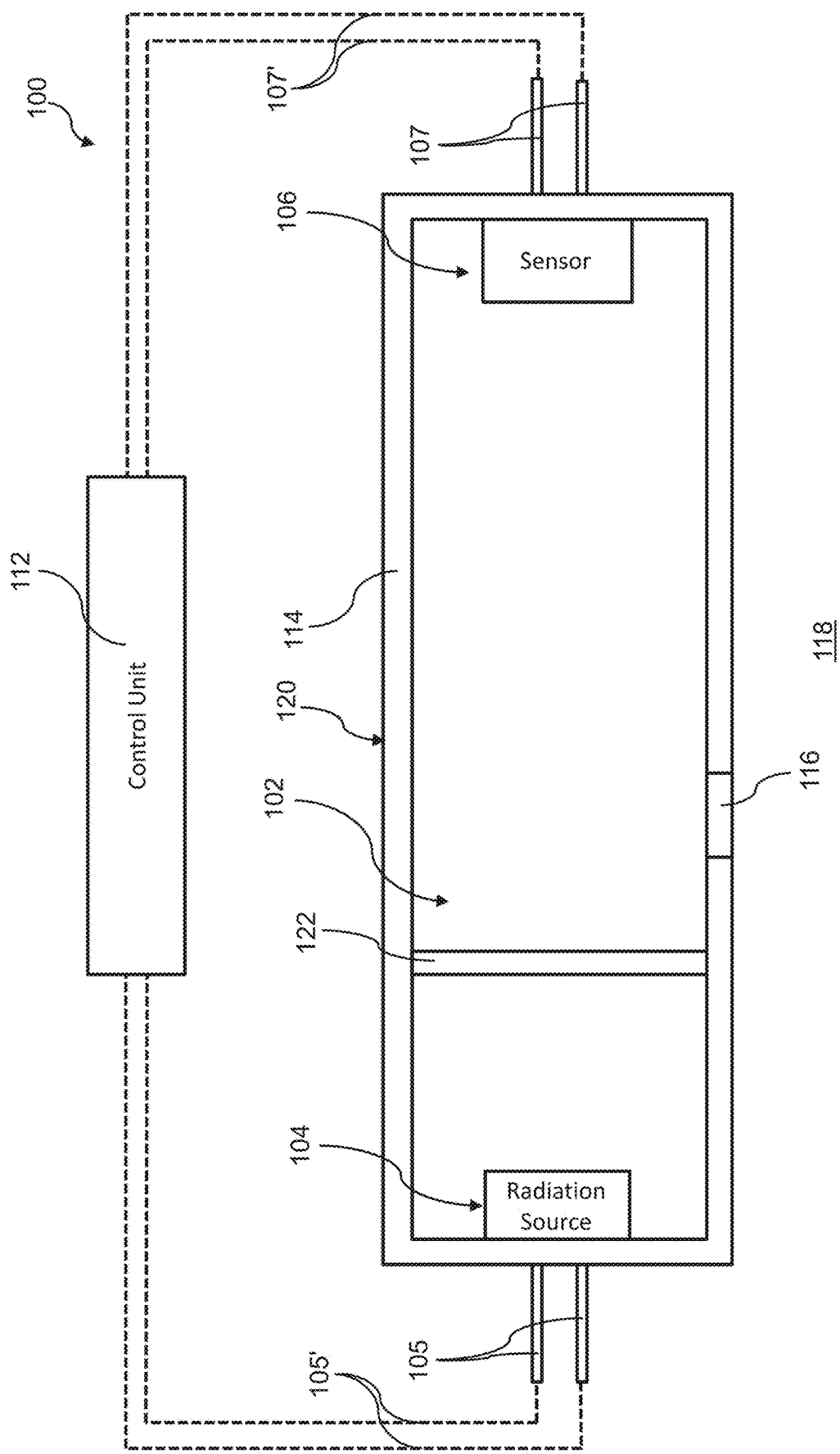
FIGS. 1A-1B are schematic views of various examples of photoacoustic gas analyzers.
Figure 1B:
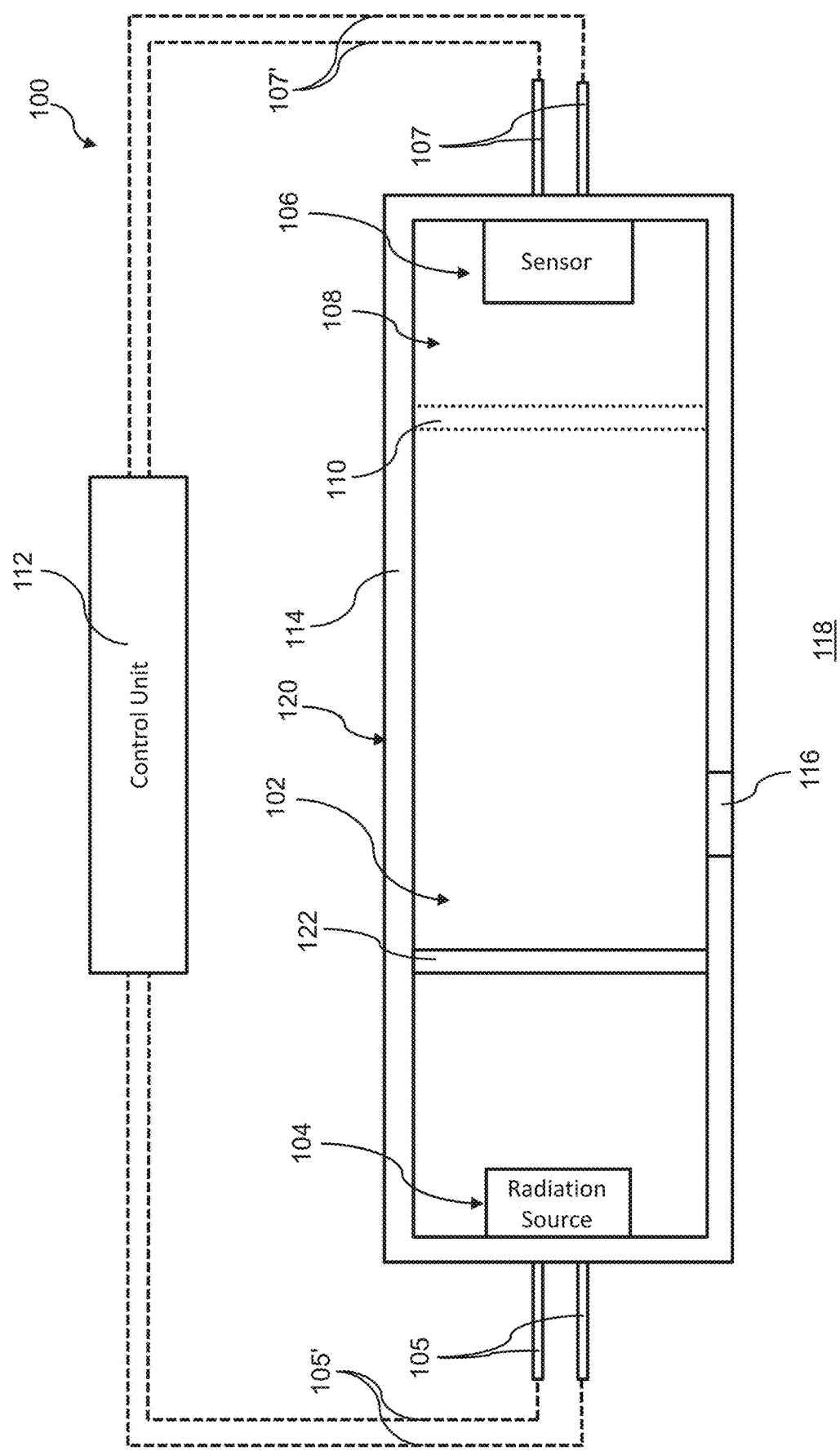

FIGS. 1A-1B are schematic views of various examples of photoacoustic gas analyzer 100. The photoacoustic gas analyzer 100 may include a gas chamber 102 configured to receive a gas to be analyzed therein, and a radiation source 104 configured to emit into the gas chamber 102 electromagnetic radiation with a time-varying intensity adapted to selectively excite gas molecules of N predetermined mutually different gas types the concentrations of which in the gas received in the gas chamber 102 are to be determined. By means of the interaction of the electromagnetic radiation emitted by the radiation source 104 with gas molecules of the gas types of interest acoustic waves are generated that are indicative of the concentrations of the gas types of interest in the gas chamber 102. As shown in FIGS. 1A-1B, the photoacoustic gas analyzer 100 may further include an acoustic-wave sensor 106 configured to detect said acoustic waves. In the following, the working principle of the photoacoustic gas analyzer 100 will be outlined.

In the photoacoustic gas analyzer 100, the radiation source 104 is configured to emit into the gas chamber 102 electromagnetic radiation in a time-varying fashion, meaning that the intensity of the electromagnetic radiation is time-varying. The electromagnetic radiation emitted by the radiation source 104 may be adapted to induce specific atomic and/or molecular transitions in gas molecules of the gas types the concentrations of which are to be determined in the gas received in the gas chamber 102 and/or to excite various vibrational and/or rotational modes of said gas molecules. During the subsequent de-excitation of the thus excited gas molecules, heat is generated leading to a local expansion of the gas received in the gas chamber 102 causing a positive pressure pulse.

The excessive heat generated in this way is subsequently dissipated to a heat sink leading to a contraction of the gas causing a negative pressure pulse. A heat sink may be provided by a holder that is in physical contact with the photoacoustic gas analyzer 100.

Since the intensity of the electromagnetic radiation varies with time, the gas molecules of interest are excited in a time-varying fashion. In this way, a time-varying pressure fluctuation is generated in the gas received in the gas chamber 102. Hence, acoustic waves are generated in this way.

The acoustic-wave sensor 106 may be positioned inside of the gas chamber 102. In a such configured photoacoustic gas analyzer 100, the sensor response increases with increasing concentration of the gas molecules of interest, i.e. of the gas molecules of the gas types the concentrations of which are to be determined. A photoacoustic gas analyzer 100 of this kind is referred to in this specification as a photoacoustic gas analyzer 100 of the direct detection type.

Alternatively, as shown in FIG. 1B, the photoacoustic gas analyzer 100 may be configured as a photoacoustic gas analyzer of the differential detection type, meaning that the acoustic-wave sensor 106 is not positioned inside of the gas chamber 102, but in a reference-gas chamber 108 gas-tightly separated from the gas chamber 102 by a window 110 that is transparent for the electromagnetic radiation emitted by the radiation source 104. In the reference-gas chamber 108, a reference gas with a well-defined composition including gas molecules of each gas type of interest is received. More specifically, in the reference-gas chamber 108 the gas types the concentrations of which in the gas chamber 102 are to be determined have well-defined and known concentrations.

In a photoacoustic gas analyzer 100 of the differential detection type electromagnetic radiation emitted by the radiation source 104 passes through the gas chamber 102 and selectively interacts with gas molecules of the different gas types of interest. By means of the selective interaction with the molecules of interest, the intensity of the electromagnetic radiation is attenuated depending on the concentration of the gas types of interest in the gas to be analyzed in the gas chamber 102, meaning that the attenuation increases with increasing concentration of the gas types of interest. Consequently, the attenuation of the electromagnetic radiation is indicative of the concentration of the gas types of interest. After passing through the gas chamber 102, the electromagnetic radiation enters the reference-gas chamber 108 through the window 110 and selectively excites gas molecules of the gas types of interest in the reference gas. The more the electromagnetic radiation is attenuated in the gas chamber 102 the lower will be its intensity in the reference-gas chamber 108 and the lower will be the response of the acoustic-wave sensor 106. Consequently, in a photoacoustic gas analyzer 100 of the differential detection type the response of the acoustic-wave sensor 106 decreases with increasing concentration of the molecules of the gas types interest in the gas chamber 102.

The radiation source 104 may be configured to emit electromagnetic radiation in the infrared and/or in the visible and/or in the ultraviolet frequency range. Infrared light is suitable for exciting vibrational molecular modes. By way of example, infrared light with a wavelength ranging from about 4.170 to about 4.370 µm and from about 14 to about 16 µm is suitable for exciting vibrational modes of $CO_2$ molecules.

The radiation source 104 may include at least one of a group including a black-body radiator, a gray-body radiator, a photodiode, and a laser. Signal and/or power supply lines 105 of a such configured radiation source 104 are shown in FIGS. 1A-1B.

A black-body radiator is configured to emit electromagnetic radiation according to Planck's law, meaning that its radiation spectrum is determined by its temperature, not by its shape or composition. The radiation source 104 may include a black-body radiator configured as an electrically heatable body such as a membrane. In operation, the electrically heatable body may be electrically heated up to temperatures higher than 450° C. By definition, a black-body radiator in thermal equilibrium has an emissivity of $\varepsilon=1.0$. A radiator configured to emit electromagnetic radiation according to Planck's law with a lower emissivity as compared to a black-body radiator is referred to as a gray-body radiator.

The acoustic-wave sensor 106 may include or may be configured as a capacitive acoustic-wave sensor having two membranes spaced apart from each other and defining a capacitor therebetween. One of the membranes may be fixed and the respective other one may be displaceable by acoustic waves to be detected. A displacement of the displaceable membrane may be indicative of characteristics of the acoustic waves to be detected and may induce a change of the capacitance of the capacitor that can be detected by a suitable read-out circuit providing an electric signal indicative of characteristics of the acoustic waves to be detected such as of the acoustic pressure.

Additionally or alternatively, the acoustic-wave sensor 106 may include or may be configured as a piezoelectric acoustic-wave sensor having a piezoelectric thin film that is deformable by acoustic waves to be detected. A deformation of the piezoelectric thin film may generate an electric voltage therein that is indicative of characteristics of acoustic waves to be detected. The induced electric voltage may be read out by a suitable read-out circuit providing an electric signal indicative of characteristics of the acoustic waves to be detected such as of the acoustic pressure.

In FIGS. 1A-1B, signal and/or power supply lines of the acoustic-wave sensor 106 are denoted by the reference numeral 107.

The radiation source 104 as well as the acoustic-wave sensor 106 may be connected by respective lines 105' and 107' to a control unit 112 including or being configured, e.g., as an application specific integrated circuit (ASIC) or as a microprocessor, and adapted to determine the concentration of the gas types of interest in the gas chamber 102 from signals received from the acoustic-wave sensor 106.

As indicated in FIGS. 1A-1B, the gas chamber 102 may be delimited by a gas chamber wall 114. A through hole 116 serving as a gas inlet and/outlet may be provided in the gas chamber wall 114. The through hole 116 may be at least temporarily or permanently open. In this way, the gas chamber 102 may be temporarily or even permanently in gas flow communication with the exterior 118 of the photoacoustic gas analyzer 100. A gas exchange between the gas chamber 102 and the exterior 118 of the photoacoustic gas analyzer 100 by diffusion may be provided in this way such that the composition of ambient air can be monitored by means of the photoacoustic gas analyzer 100.

Consequently, the photoacoustic gas analyzer 100 may be used for monitoring the composition of ambient air, e.g., for determining the content of $CO_2$ and/or of toxic gases such as of CO in ambient air. Methane and/or water molecules (humidity) in ambient air may also be detected in this way. Alternatively or additionally, the photoacoustic gas analyzer 100 may be configured and used as a breath analyzer to measure the content of alcohol and/or acetone which is indicative of the blood glucose level.

A high efficiency of the excitation of gas molecules of interest in the gas chamber 102 may be achieved by providing a reflector 120 on the gas chamber wall 114. The reflector 120 may have a reflectance in the infrared and/or in the visible and/or in the ultraviolet frequency range of at least 20% or of at least 50/o or even of at least 80%.

The gas analyzer 100 may further include a window 122 transparent for electromagnetic radiation emitted by the radiation source 104 and positioned between the radiation source 104 and the gas chamber 102. As indicated in FIGS. 1A-1B, the window 122 may gas-tightly separate the radiation source 104 from the gas chamber 102 and may thermally decouple the gas received in the gas chamber 102 from the radiation source 104.

The window 122 may include or may be configured as a filter adapted to selectively transmit electromagnetic radiation of a predetermined energy. In principle, a tunable filter with tunable transmission characteristics can be employed in a gas analyzer of this kind. In operation, the transmission characteristics of the filter 122 may be varied to successively excite gas molecules of the different gas types of interest. The filter 122 may include or may be configured as a plasmonic filter and/or a Fabry-Pérot interferometer such as a Fabry-Pérot etalon.

Filters with tunable transmission characteristics, however, suffer from mechanically low robustness as well as from very small transmission windows, and need to be actively and very precisely controlled.

Therefore, a filter with fixed transmission characteristics is desirable. More specifically, a filter configured to transmit electromagnetic radiation emitted by the radiation source 104 in an energy range that includes excitation energies of molecules of all gas types of interest in the gas chamber 102 would overcome the above-mentioned drawbacks of tunable filters. However, it should be noted that a filter is optional in a photoacoustic gas analyzer 100 according to the present disclosure, and may be omitted in case the radiation source 104 is configured to emit electromagnetic radiation in a well-defined energy range such as a laser source.

Irrespective of whether a filter 122 is employed or not, a key aspect of a photoacoustic gas analyzer 100 of the present disclosure is that molecules of N mutually different gas types of interest in the gas chamber 102 are excited simultaneously and that the acoustic waves detected by the acoustic-wave sensor 106 reflect an integral interaction of the electromagnetic radiation emitted by the radiation source 104 with the molecules of the N mutually different gas types of interest. A way of determining the concentrations of the N mutually different gas types by a photoacoustic gas analyzer 100 according to the present disclosure will be described in the following.

In the following description, it is assumed that N predetermined mutually different gas types may be contained in the gas received in the gas chamber 102, and that the respective concentrations of the N mutually different gas types in the gas received in the gas chamber 102 are to be determined. Here, N is an integer number.

As shown in FIGS. 1A-1B, the control unit 112 may be operatively connected to the radiation source 104 and to the acoustic-wave sensor 106. The control unit 112 may be configured to control the radiation source 104 to emit electromagnetic radiation with a time-varying frequency-modulated intensity. More specifically, the control unit 112 may be configured to modulate the frequency at which the intensity is varied with a modulation signal taking on at least N mutually different values. Here, N corresponds to the number of the mutually different gas types of interest the concentrations of which in the gas received in the gas chamber 102 are to be determined.

In this way, the frequency f at which the intensity of the electromagnetic radiation emitted by the radiation source 104 is varied is a function of time t: f=f(t). The time dependence of the frequency at which the intensity of the electromagnetic radiation is varied is determined by the modulation signal.

In an exemplary embodiment, the modulation signal may be at least partially strictly monotonically increasing and/or strictly monotonically decreasing, meaning that the frequency at which the intensity of the electromagnetic radiation emitted by the radiation source 104 is varied may temporarily strictly monotonically increase and/or temporarily strictly monotonically decrease. A modulation signal of this kind may be configured at least partially as a sinusoidal signal, a triangle signal, or a sawtooth signal.

In an exemplary embodiment, the modulation signal may be at least partially linearly increasing and/or at least partially linearly decreasing. A modulation signal of this kind may be configured, e.g., as a triangle signal, or a sawtooth signal.

Alternatively, the modulation signal may be configured as a staircase signal taking on at least N mutually different values.

As mentioned above and as also indicated in FIGS. 1A-1B, the control unit 112 is operatively connected to the acoustic-wave sensor 106 and may receive signals generated by the acoustic-wave sensor 106 in response to the detected acoustic waves. Since the intensity of the electromagnetic radiation emitted by the radiation source 104 is time-varying and the frequency at which the intensity is varied is modulated, the signal generated by the acoustic-wave sensor 106 is also time-varying and its frequency is modulated according to the modulation signal.

The control unit 112 may be configured to determine N mutually different signal amplitudes, e.g., local maxima, of the signal received from the acoustic-wave sensor 106, as well as their timings. Since an unambiguous relationship exists between time and frequency, the respective frequencies associated with the determined signal amplitudes can be determined from their corresponding timings. Hence, the determined N mutually different signal amplitudes can be assigned to corresponding frequencies at which the intensity of the electromagnetic radiation is varied.

The basic principle underlying the determination scheme employed by the control unit 112 is based on a mutually different response of the molecules of the different gas types to the frequency-modulated intensity of the electromagnetic radiation. The mutually different responses of the molecules of the different types of molecules is due to their individual thermal relaxation times, collision relaxation times, and radiative lifetimes. The mutually different responses of the different types of molecules is reflected in a characteristic frequency-dependence of the amplitude of the signal received by the control unit 112 from the acoustic-wave sensor 106, meaning that the frequency-dependence is determined by the concentrations of the gas types of interest present in the gas chamber 102.

The dependence of the signal amplitudes received by the control unit 112 from the acoustic-wave sensor 106 on frequency may be expressed by the following equation in case of a modulation signal that decreases linearly with time:

$$I(f)=1-\exp[(I_1+\ldots+I_N)f] \tag{1}$$

In expression (1), I(f) denotes the amplitude of a signal of the acoustic-wave sensor 106, and $I_1$ to $I_N$ respectively denote signal components or partial amplitudes associated with the N mutually different gas types and indicative of the concentrations of the N mutually different gas types.

In equation (1) the signal components are unknown and are to be determined in order to determine therefrom the concentrations $C_1$ to $C_N$ of the N mutually different gas types.

As previously mentioned, the control unit 112 is configured to determine N mutually different signal amplitudes $I(f_n)$ associated with N mutually different frequencies $f_n$. In this way, a set of N mutually different signal amplitudes $I(f_1)$ to $I(f_N)$ is obtained that can be used to set up the following system of equations:

$$I(f_1)=1-\exp[(I_1+\ldots+I_N)f_1] \tag{2-1}$$

$$I(f_2)=1-\exp[(I_1+\ldots+I_N)f_2] \tag{2-2}$$

$$\ldots$$

$$I(f_N)=1-\exp[(I_1+\ldots+I_N)f_N] \tag{2-N}$$

This system of equation includes N equations with N unknowns, i.e. the partial signal amplitudes $I_1$ to $I_N$ indicative of the concentrations $C_1$ to $C_N$ of the N gas types of interest. Consequently, this system of equations can be solved analytically to determine the respective partial signal amplitudes $I_1$ to IN. The detailed steps of solving the above system of equations are known to the skilled person and are therefore omitted here.

From the above, it is clear that only in case the modulation signal takes on at least N mutually different values, signal amplitudes associated with N mutually different frequencies can be extracted from the acoustic-wave sensor signal in order to solve the above system of equations (2-1) to (2-N).

The analysis of an exemplary gas consisting of $CO_2$ and $H_2O$ as the gas types the concentrations of which are to be determined by the photoacoustic gas analyzer 100 will be described in the following with reference to FIGS. 2 and 3.

Figure 2:
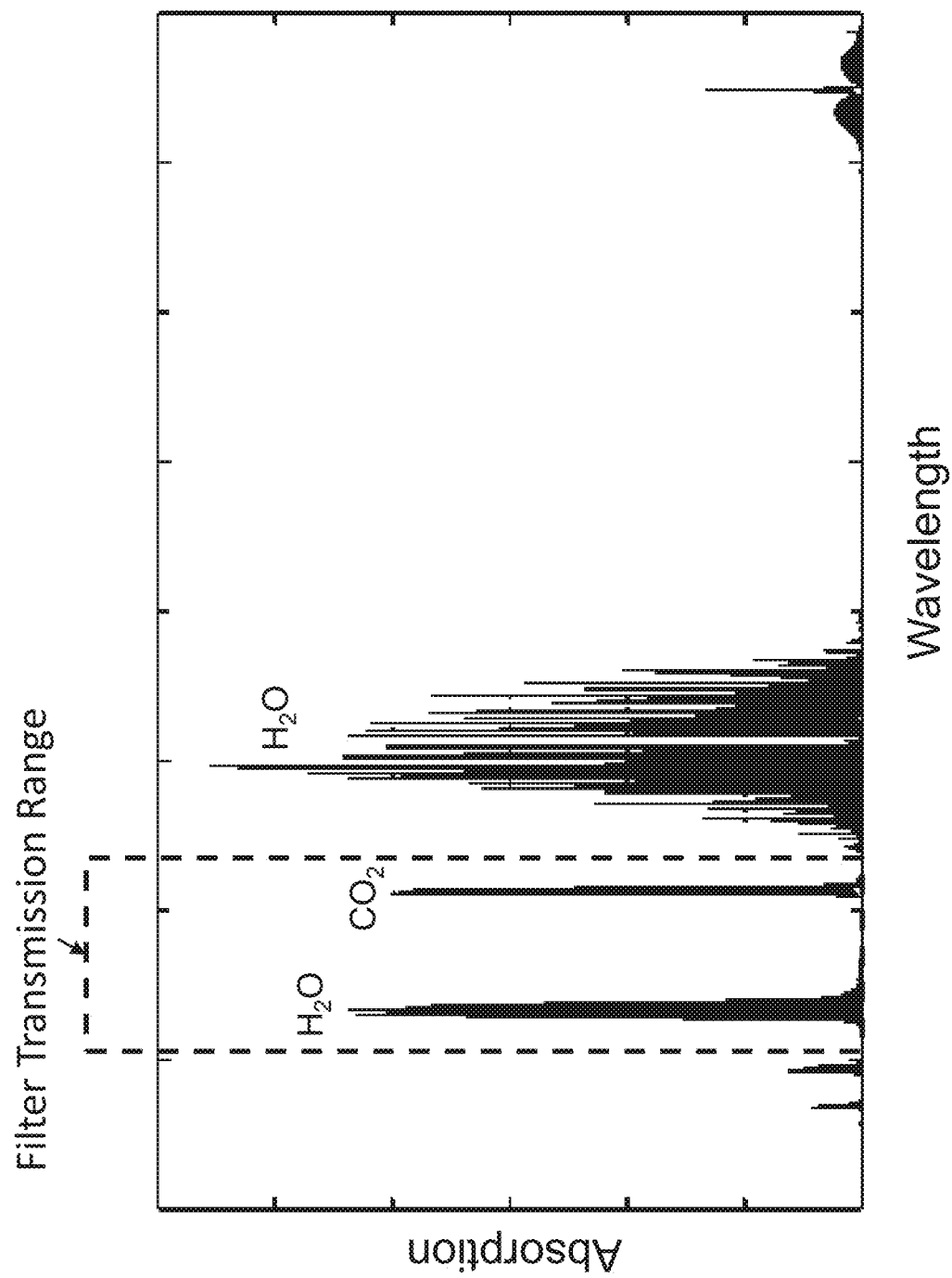
FIG. 2 is an absorption spectrum of an exemplary gas containing $CO_2$ and $H_2O$.

In FIG. 2, an absorption spectrum of the exemplary gas is depicted. In the spectrum, several characteristic peaks originating from either $CO_2$ or $H_2O$ are shown. The dashed box indicates the transmission range of a filter with fixed transmission characteristics, e.g., of the filter 122 shown in FIGS. 1A-1B. The transmission range includes excitation wavelengths of both gas types of interest, i.e. of $CO_2$ and $H_2O$, meaning that a filter of this kind is configured to selectively transmit electromagnetic radiation configured to excite molecules of both gas types of interest, i.e., of $CO_2$ and $H_2O$. Consequently, the acoustic-waves detected by the acoustic-wave sensor 106 originate from the interaction of the transmitted electromagnetic radiation with molecules of both gas types.

Figure 3:
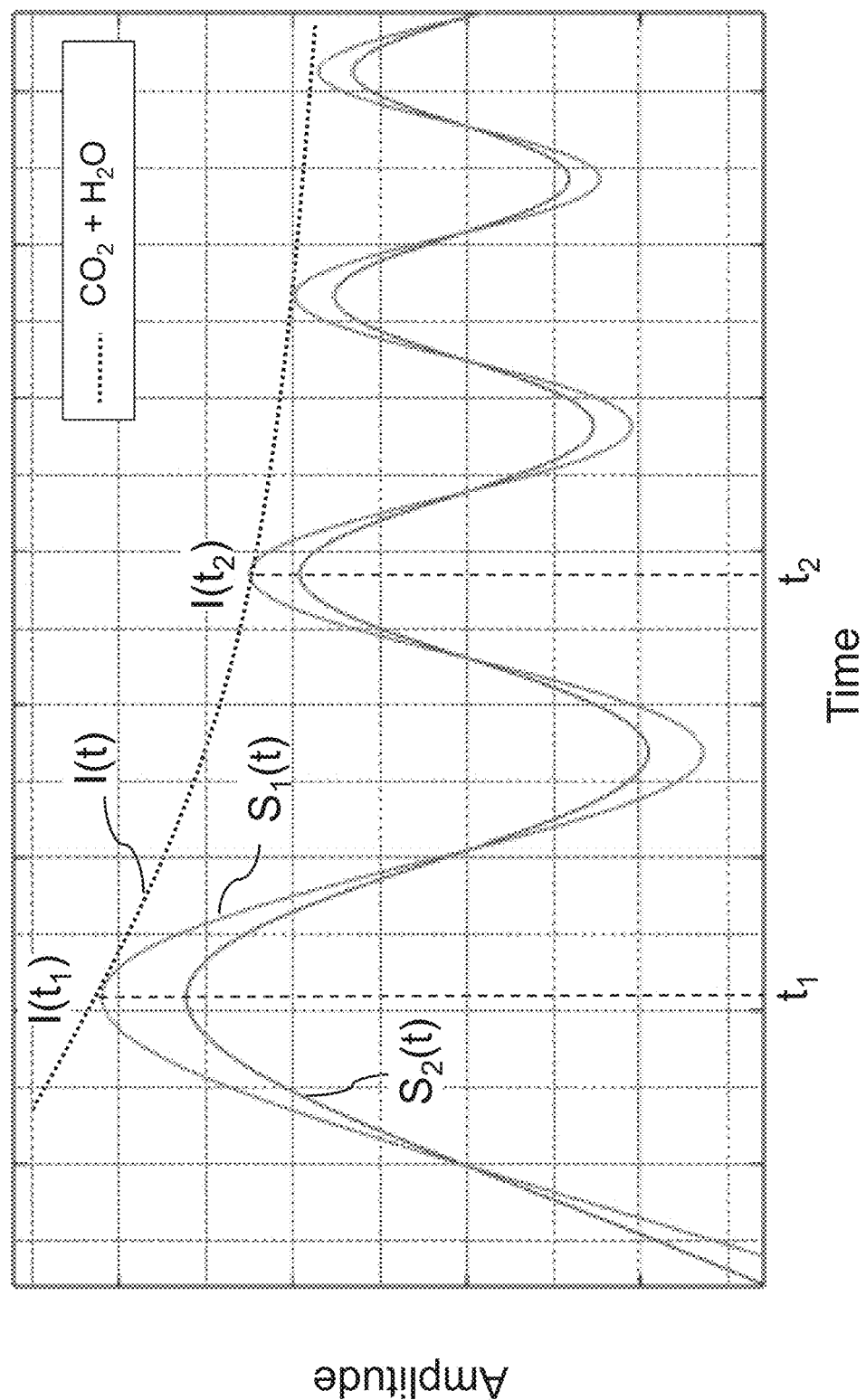
FIG. 3 shows the response of the photoacoustic gas analyzer of FIG. 1A.

The time-dependent signal $S_1(t)$ generated by the acoustic-wave sensor 106 in response to acoustic waves originating from both $CO_2$ and $H_2O$ is shown in FIG. 3 together with a comparative time-dependent sensor signal $S_2(t)$ for a comparative gas consisting of $CO_2$ only. The radiation source 104 has been operated identically in both cases, meaning that the intensity of the emitted electromagnetic radiation as well as the time dependence of the intensity were identical in both cases. More specifically, in both cases the frequency at which the intensity was varied was modulated by the same linearly decreasing modulation signal. As can clearly be seen in FIG. 3, the response of the acoustic-wave sensor 106 is different for different gases with different compositions.

As also shown in FIG. 3, the signal amplitude I, i.e. the local maxima of the signal, decreases with time t. Since, as previously mentioned, the frequency at which the intensity is varied is modulated by a linearly decreasing modulation signal, a linear relationship of the form f=−kt exists between frequency f and time t. In this expression k is a constant factor. Consequently, the time-dependent signal $S_1(t)$ can be converted into a frequency-dependent signal $S_1(f)$ from which frequency-dependent amplitudes $I(f)$ can be determined. Since the exemplary gas contains two gas types, two mutually different signal amplitudes $I(f_1)$ and $I(f_2)$ associated with two mutually different frequencies $f_1$ and $f_2$ have to be determined in order to solve the above equation (1) for two unknown signal components $I_{H2O}$ and $I_{CO2}$ originating from $H_2O$ and $CO_2$, respectively. More specifically, a system of two equations with two unknowns can be set up on the basis of equation (1):

$$I(f_1)=1-\exp[(I_{H2O}+I_{CO2})f_1] \quad (3\text{-}1)$$

$$I(f_2)=-\exp[(I_{H2O}+I_{CO2})f_2] \quad (3\text{-}2)$$

From this system of equations, the signal components $I_{H2O}$ and $I_{CO2}$ can be determined analytically. These signal amplitudes are indicative of the respective concentrations of $CO_2$ and $H_2O$, i.e. proportional thereto. The proportional factors may be determined by calibration using gases with known concentrations of $CO_2$ and $H_2O$, respectively.

Figure 4:
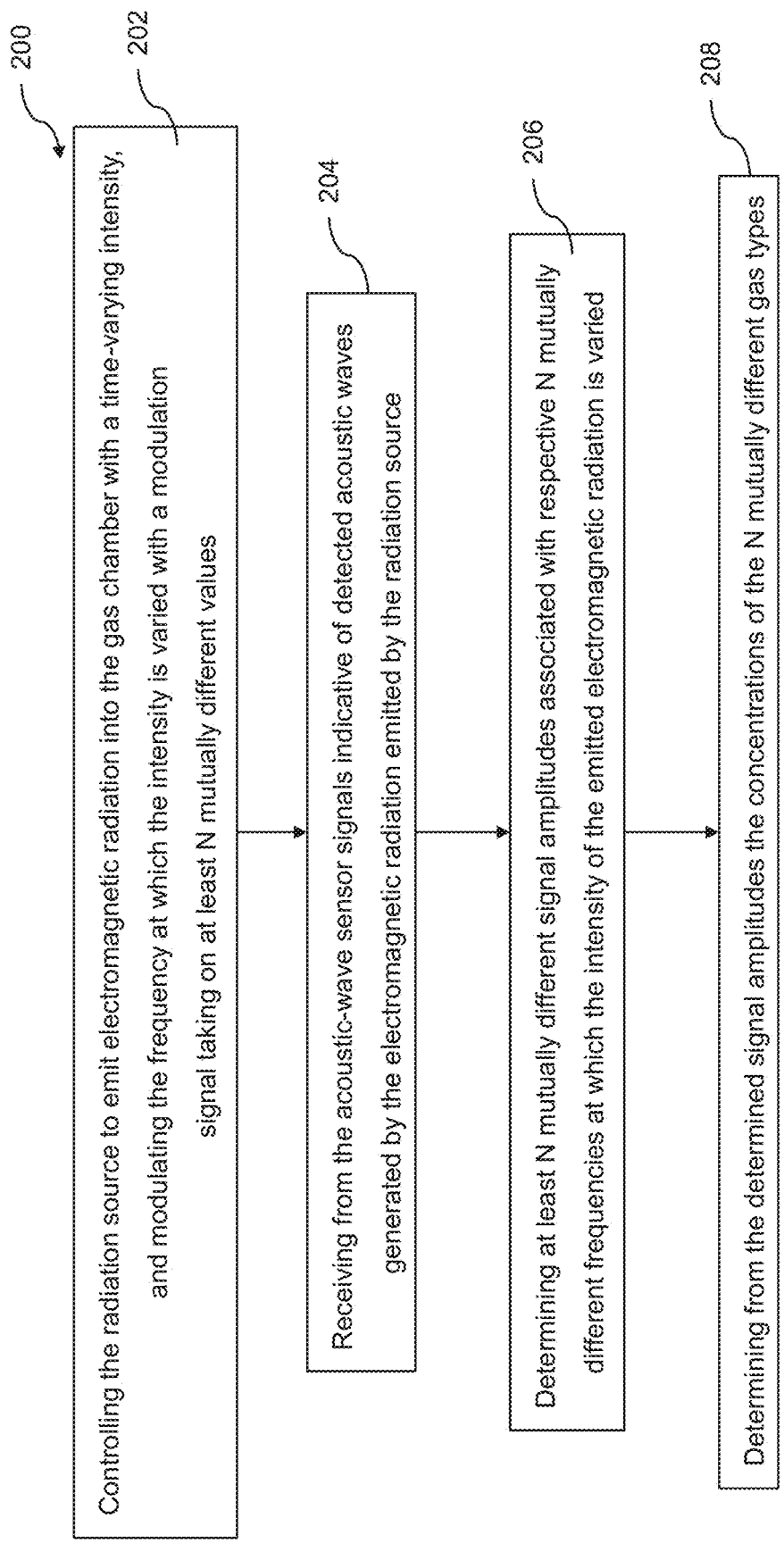
FIG. 4 is a flow chart of an exemplary method of operating the photoacoustic gas analyzer shown in FIG. 1A.

In FIG. 4, a flowchart of an exemplary method 200 of operating the photoacoustic gas analyzer 100 is shown. The method 200 may include:

Controlling the radiation source 104 to emit electromagnetic radiation into the gas chamber 102 with a time-varying intensity, and modulating the frequency at which the intensity is varied with a modulation signal taking on at least N mutually different values (202);

Receiving from the acoustic-wave sensor 106 signals indicative of detected acoustic waves generated by the electromagnetic radiation emitted by the radiation source 104 (204);

Determining at least N mutually different signal amplitudes $I(f_1)$ to $I(f_N)$ associated with respective N mutually different frequencies $f_1$ to $f_N$ at which the intensity of the emitted electromagnetic radiation is varied (206); and Determining from the determined signal amplitudes $I(f_1)$ to $I(f_N)$ the concentrations of the N mutually different gas types (208).

In an alternative embodiment, the radiation source 104 may be operable in N mutually different modes, each mode being characterized by a unique emission spectrum different from the emission spectra of the other N−1 modes. In such a case, the control unit 112 may be configured to operate the radiation source 104 in the N mutually different modes in which the radiation source 104 is respectively operated such as to emit electromagnetic radiation with a time-varying intensity. The control unit 112 may be configured to receive in each mode from the acoustic-wave sensor 106 signals indicative of detected acoustic waves generated by the electromagnetic radiation emitted by the radiation source 104, and to determine from the signals received in each mode the concentrations of N mutually different gas types.

In an exemplary embodiment, a radiation source 104 of this kind may include or may be configured as a black-body radiator or as a gray-body radiator. In the following, reference will only be made to a black-body radiator. In case of a black-body radiator, the control unit 112 may be configured to intermittently heat the black-body radiator in the N modes to a predetermined temperature respectively associated with the N modes, the N predetermined temperatures being mutually different. In this way, it can be ensured that the radiation source 104 emits in each mode a characteristic and unique spectrum different from the spectra in the other N−1 modes. By intermittently heating up the black-body radiator to the respective predetermined temperatures, electromagnetic radiation with a time-varying intensity may be emitted.

In an exemplary embodiment, the black-body radiator 104 may be heated by a square wave heating signal. In this way, the black-body radiator 104 is kept at a well-defined temperature during well-defined periods of time.

The spectrum emitted by the black-body radiator 104 includes excitation energies of the molecules of each gas type, meaning that by the electromagnetic radiation emitted by the black-body radiator 104 the molecules of each gas type of interest are excited. This in turn means that the acoustic-wave sensor 106 detects acoustic waves generated by the molecules of all gas types of interest, i.e. signals generated by the acoustic-wave sensor 106 reflect the overall interaction of the electromagnetic radiation emitted by the black-body radiator 104 with the molecules of all gas types of interest.

The control unit 112 may be configured to receive in each mode from the acoustic-wave sensor 106 signals indicative of detected acoustic waves generated by the electromagnetic radiation emitted by the black-body radiator 104.

Since the signals generated by the acoustic-wave sensor 106 reflect the overall interaction of the electromagnetic radiation emitted by the black-body radiator 104 with the molecules of the gas types of interest, the signal amplitude $I(T_i)$ received by the control unit in an i-th mode associated with a predetermined temperature $T_i$ of the black-body radiator 104 is the sum of N signal components or partial amplitudes $I_1(T_i)$ to $I_N(T_i)$ respectively associated with the N mutually different gas types. This means that the signal amplitude $I(T_i)$ can be expressed by the following relationship:

$$I(T_i) = I_1(T_i) + \ldots + I_N(T_i) \quad (4)$$

The partial amplitudes $I_1(T_i)$ to $I_N(T_i)$ depend on the respective concentrations $C_1$ to $C_N$ of the N mutually different gas types of interest. Therefore, by operating the black-body radiator 104 in the N mutually different modes, a system of equations may be set up:

$$I(T_1) = I_1(T_1) + \ldots + I_N(T_1) \quad (5\text{-}1)$$

$$\vdots$$

$$I(T_N) = I_1(T_N) + \ldots + I_N(T_N). \quad (5\text{-}N)$$

Here, $T_1$ to $T_N$ denote the N mutually different temperatures respectively associated with the N modes in which the black-body radiator 104 is operated.

The partial amplitudes $I_1(T_i)$ to $I_N(T_i)$ in the above system of equations (5-1) to (5-N) depend on the respective concentrations $C_1$ to $C_N$ that are to be determined. However, for an analytical solution of the above system of equations, several parameters have to be exactly known, in particular the number of photons emitted by the black-body radiator 104 at energies that correspond to excitation energies of the molecules of each gas type of interest. The number of photons, however, cannot be determined with high accuracy. Therefore, the concentrations $C_1$ to $C_N$ cannot be determined with high accuracy by solving the system of equations (5-1) to (5-N) analytically.

An alternative solution of the above system of equations (5-1) to (5-N) may be provided by respectively approximating the partial amplitudes $I_1(T_i)$ to $I_N(T_i)$ by the product of the concentrations $C_1$ to $C_N$ of the mutually different gas types and the values of a Planck spectrum $P_1(T_i)$ to $P_N(T_i)$ at excitation energies of the molecules of the N mutually different gas types emitted by the black-body radiator 104 in an i-th mode at a temperature $T_i$. In this way, the above system of equations (5-1) to (5-N) can be written as:

$$I(T_1) = C_1 P_1(T_1) + \ldots + C_N P_N(T_1) \quad (6\text{-}1)$$

$$\vdots$$

$$I(T_N) = C_1 P_1(T_N) + \ldots + C_N P_N(T_N) \quad (6\text{-}N)$$

The values of the Planck spectra at the N mutually different temperatures can be calculated. In an exemplary embodiment, these values can be calculated from respective normalized Planck spectra the maxima of which are normalized to 1. Consequently, the above modified system of equations (6-1) to (6-N) is a system of N equations with N unknowns, the N unknowns being the concentrations of the N mutually different gas types. Consequently, the concentrations $C_1$ to $C_N$ may be analytically determined from the above modified system of equations. In an exemplary embodiment, the thus obtained concentrations $C_1$ to $C_N$ may be subsequently normalized to give a total concentration of 1.

Figure 5:
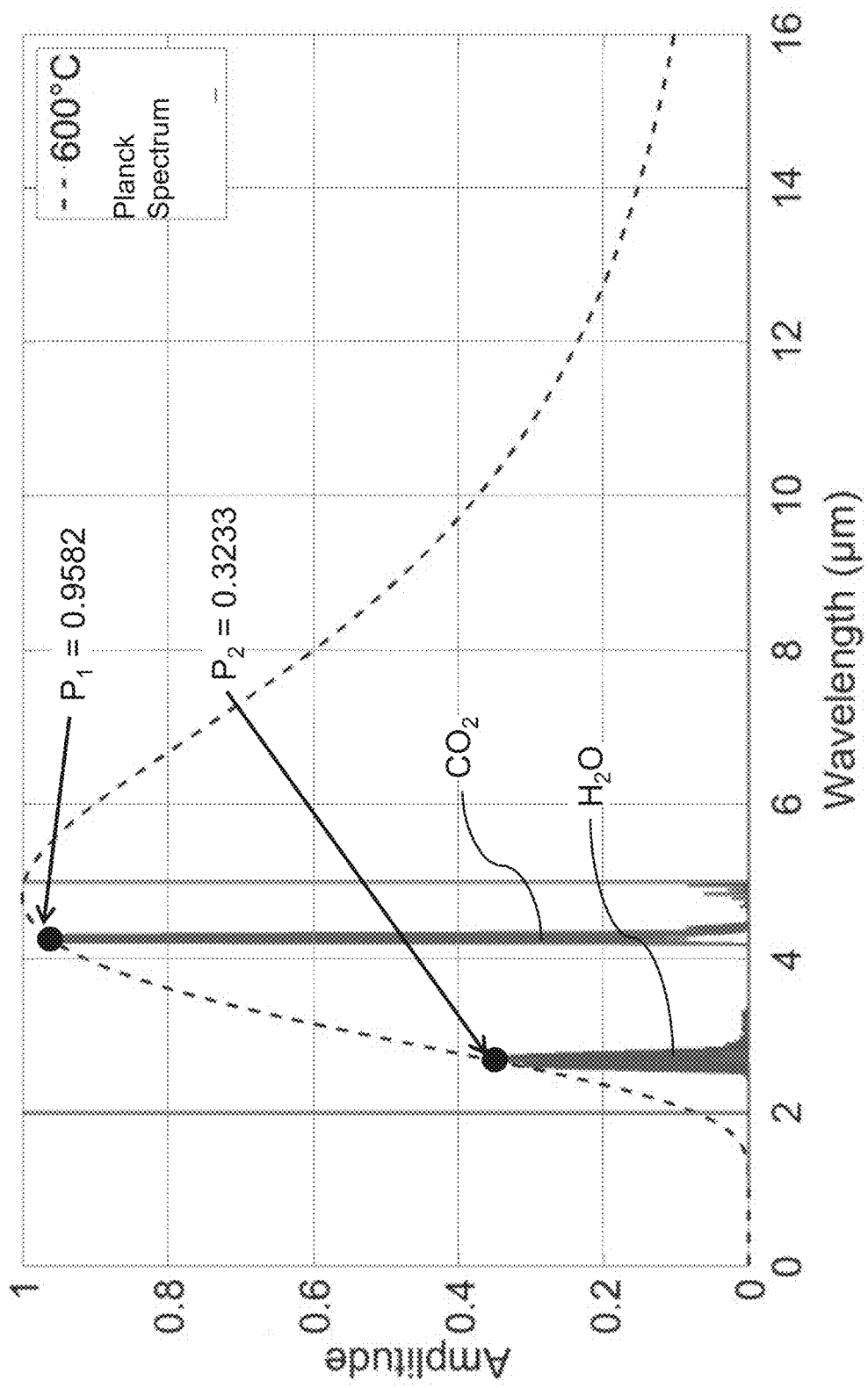
FIG. 5 is a spectrum obtained by the photoacoustic gas analyzer shown in FIG. 1A including a radiation source configured as a black-body radiator heated up to 600° C.
Figure 6:
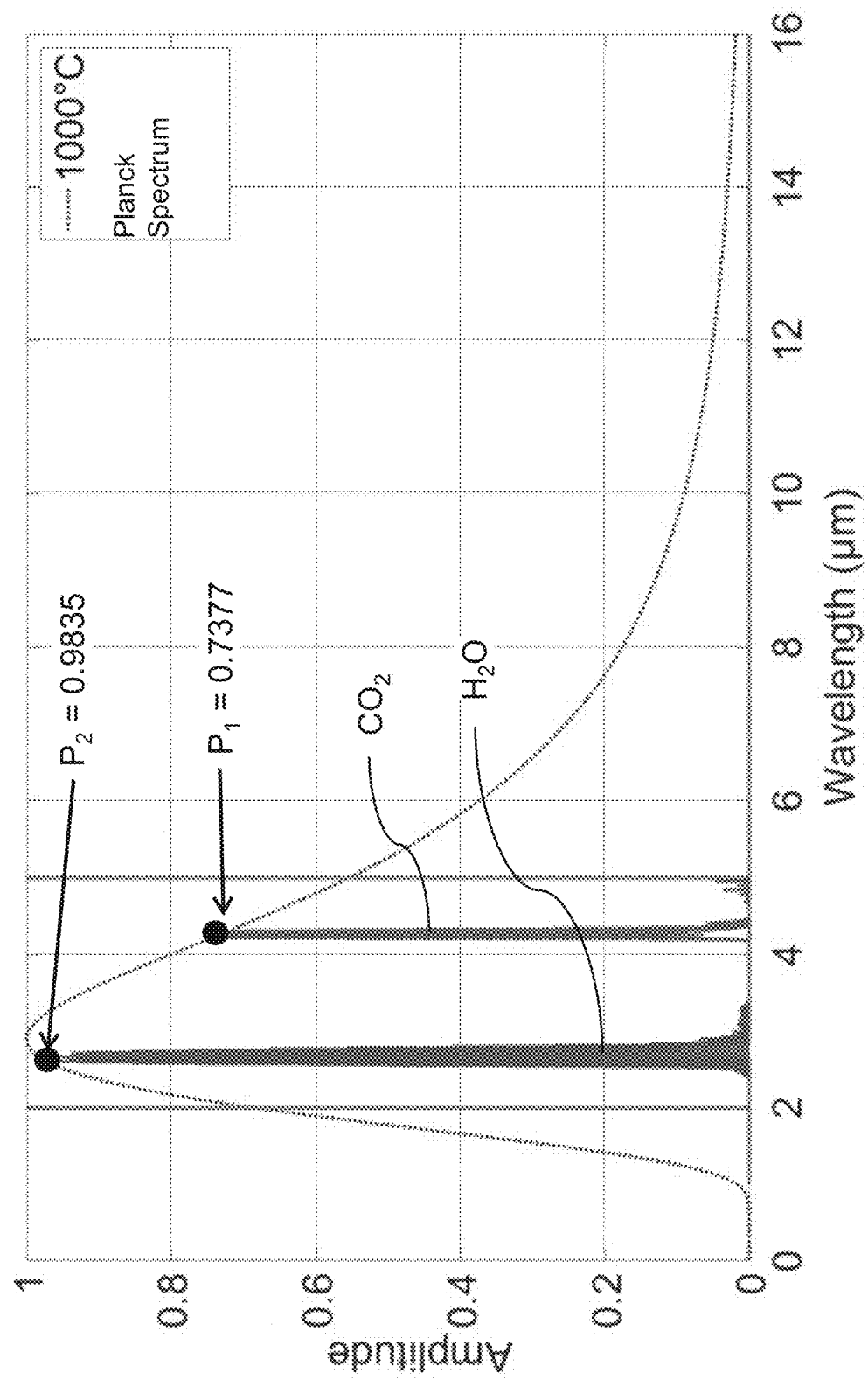
FIG. 6 is a spectrum similar to that of FIG. 5 except that the black-body radiator is heated up to 1000° C.

FIGS. 5 and 6 show spectra obtained from an exemplary gas containing $H_2O$ and $CO_2$ as its constituents in two different operation modes of the black-body radiator 104. In these exemplary two modes, the black-body radiator 104 has been intermittently heated up to 600° C. and 1000° C., respectively. Due to the temperature-dependent shape of the Planck spectrum, the ratio of the intensities emitted at the respective excitation energies of the $H_2O$ and $CO_2$ molecules by the black-body radiator 104 changes with changing emission temperature. This is indicated by the different heights of the peaks originating from the $H_2O$ and $CO_2$ molecules. In FIGS. 5 and 6, the vertical lines on the left and right sides of the peaks indicate the transmission window of an optical filter, e.g. of the optical filter 122 shown in FIGS. 1A-1B, employed for a selective transmission of the electromagnetic radiation emitted by the black-body radiator 104. The transmission window ranges from a wavelength of about 2 μm to about 5 μm.

In FIGS. 5 and 6, the respective Planck spectra have maxima normalized to 1. The values $P_1$ and $P_2$ of the thus normalized Planck spectra at excitation energies of $H_2O$ molecules and $CO_2$ molecules are given in FIGS. 5 and 6 for the corresponding black-body temperatures of 600° C. and 1000° C.

Figure 7:
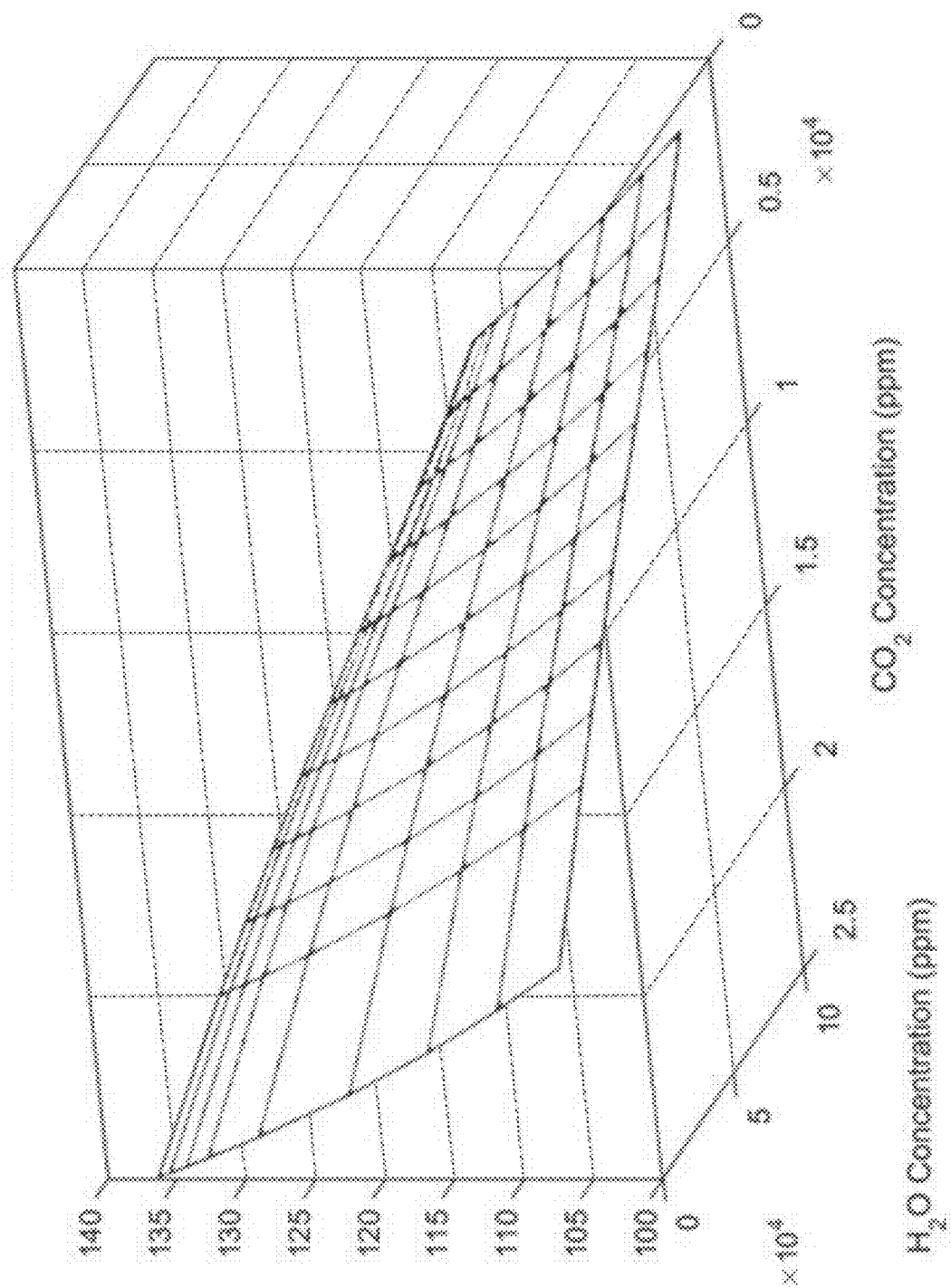
FIG. 7 is an illustration of the error associated with a method of determining the concentrations of the constituents of a gas based on operating the black-body radiator in different modes.

In FIG. 7, the expected error of this method is shown as a function of the $CO_2$ and $H_2O$ concentrations. As can clearly be seen in this figure, the expected error increases with increasing $CO_2$ concentration and decreases with increasing $H_2O$ concentration. At low $H_2O$ concentrations, an error of about 35% is expected.

Figure 8:
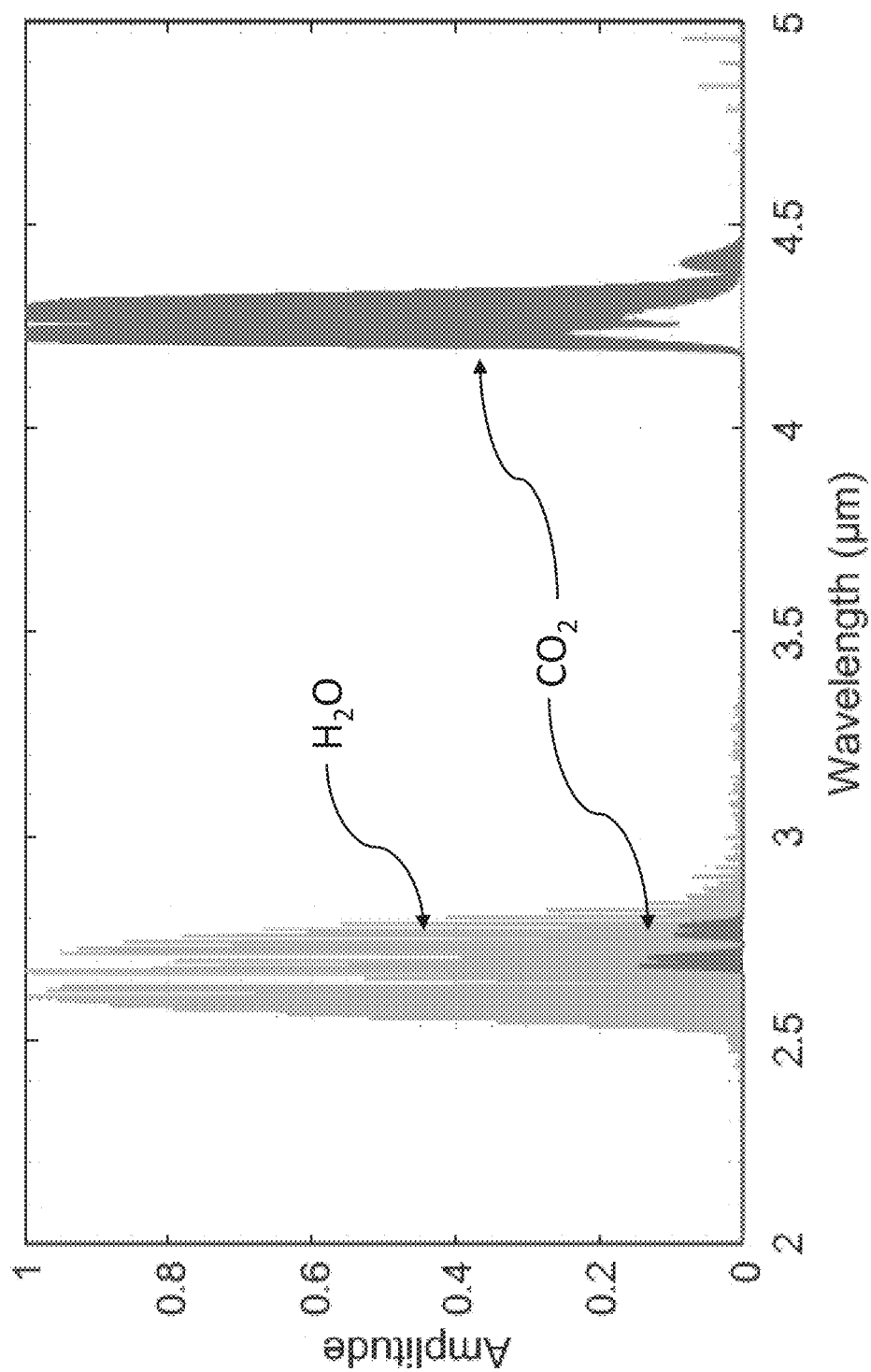
FIG. 8 is a spectrum showing characteristic peaks originating from $CO_2$ and $H_2O$ molecules.

This error is due to the fact that some of the $H_2O$ excitation energies coincide with excitation energies of $CO_2$. This is indicated in the spectrum shown in FIG. 8. Therefore, in case of low $H_2O$ concentrations, $CO_2$ molecules mimic a higher $H_2O$ concentration leading to the error indicated in FIG. 7.

Figure 9:
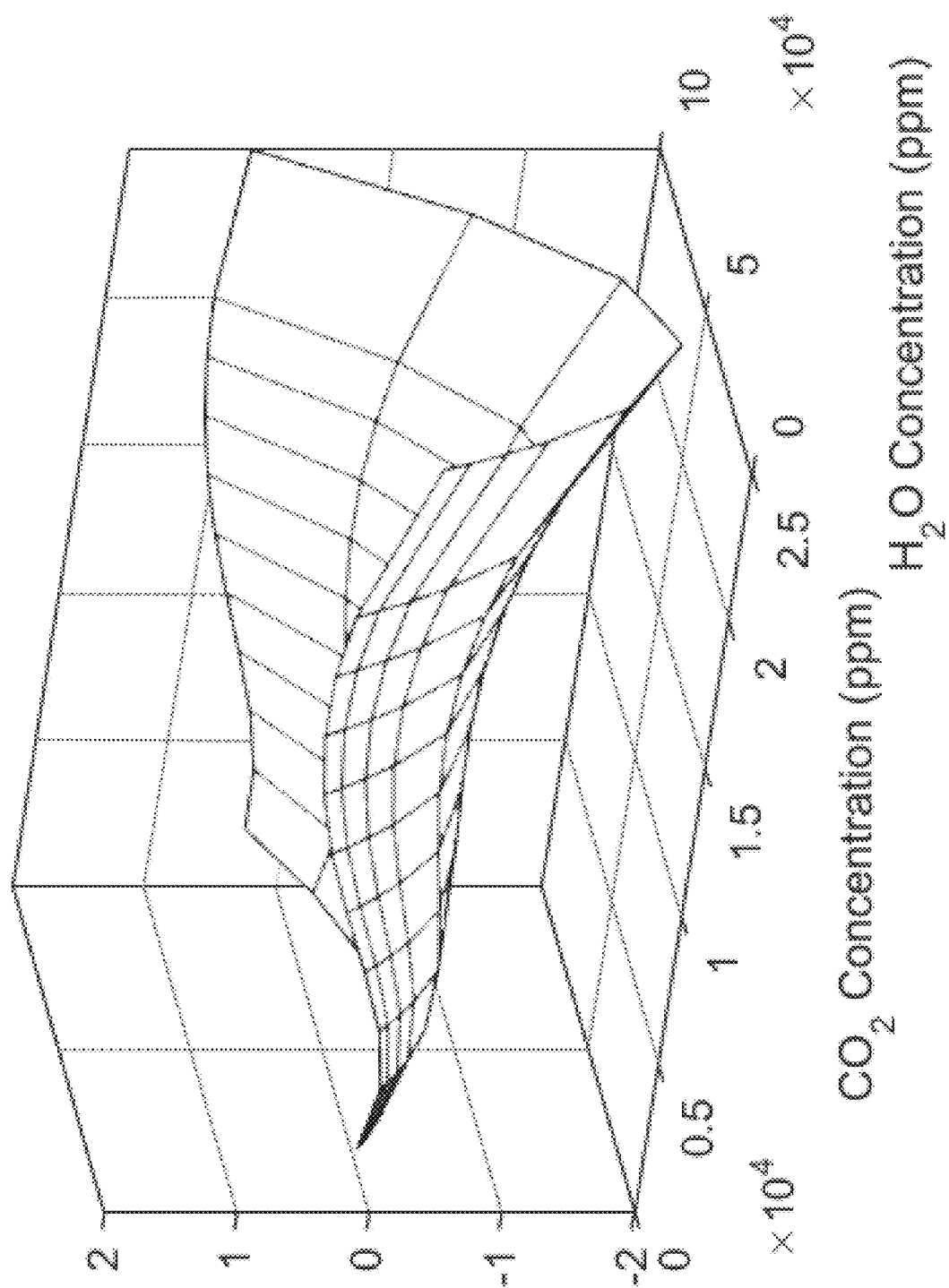
FIG. 9 is an illustration of the error associated with a modified method of determining the concentrations of the constituents of a gas based on operating the black-body radiator in different modes.

This shortcoming of the above method may be overcome in the case of overlapping peaks by calibrating the height of a non-overlapping peak of a gas constituent. In the above-described gas with $CO_2$ and $H_2O$ as its constituents the height of the main $CO_2$ peak may be calibrated which in turn provides information on the height of the $CO_2$ peak overlapping the $H_2O$ peak. In this way, the error associated with the determination of the $H_2O$ concentration may be reduced. The thus reduced error as a function of the $CO_2$ and $H_2O$ concentrations is illustrated in FIG. 9. As indicated in FIG. 9, an error of less than 2% may be obtained in this way.

The error may be further reduced by evaluating the respective spectra at more than one excitation energy per gas type.

Figure 10:
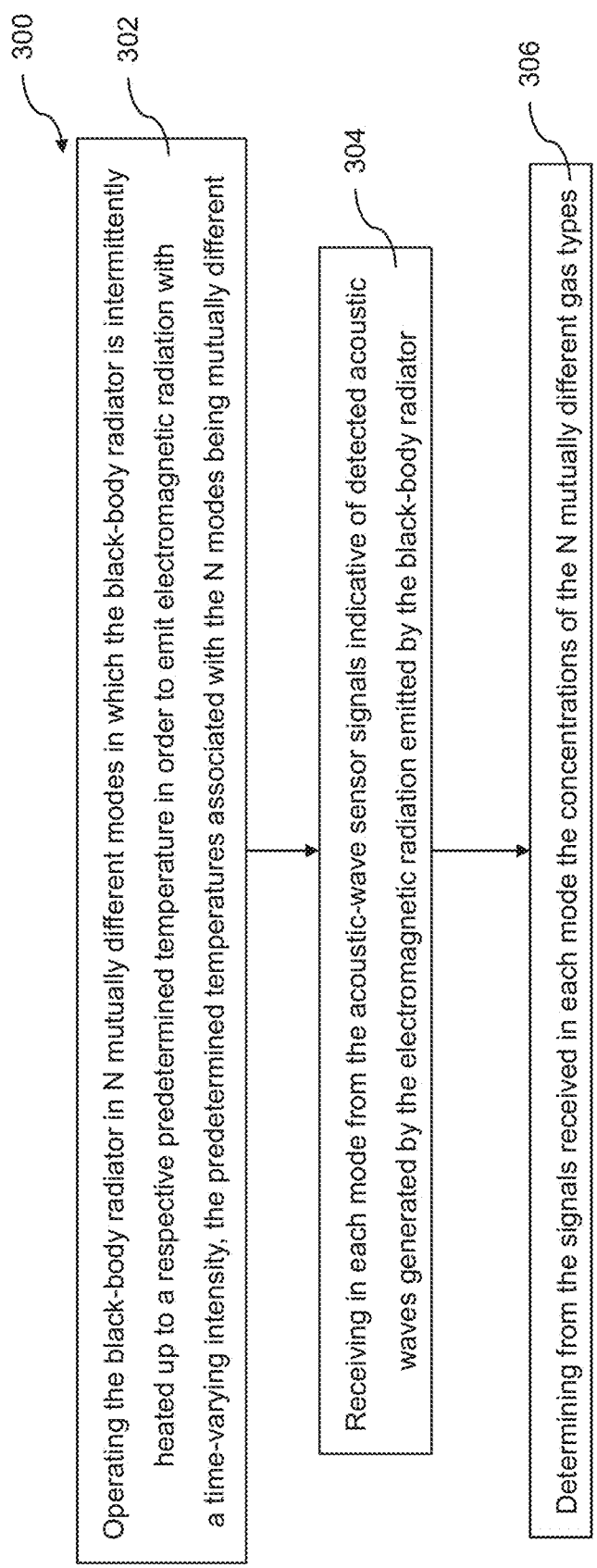
FIG. 10 is a flow chart of an alternative exemplary method of operating the photoacoustic gas analyzer shown in FIG. 1A.

In FIG. 10, a flowchart illustrating the above-described alternative method 300 of operating the photoacoustic gas analyzer 100 is shown. The method 300 may include:

Operating the black-body radiator 104 in N mutually different modes in which the black-body radiator 104 is intermittently heated up to a respective predetermined temperature in order to emit electromagnetic radiation with a time-varying intensity, the predetermined temperatures associated with the N modes being mutually different (302);

Receiving in each mode from the acoustic-wave sensor 106 signals indicative of detected acoustic waves generated by the electromagnetic radiation emitted by the black-body radiator 104 (304); and Determining from the signals received in each mode the concentrations of the N mutually different gas types (306).

In the following, various examples according to the present disclosure will be described.

Example 1 is a photoacoustic gas analyzer. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, an acoustic-wave sensor configured to detect acoustic waves generated by the electromagnetic radiation emitted by the radiation source, and a control unit operatively connected to the radiation source and the acoustic-wave sensor. The control unit may be configured: to control the radiation source to emit electromagnetic radiation with a time-varying intensity and to modulate a frequency at which the intensity is varied with a modulation signal taking on at least N mutually different values, to receive from the acoustic-wave sensor signals indicative of detected acoustic waves generated by the electromagnetic radiation emitted by the radiation source, to determine at least N mutually different signal amplitudes associated with respective N mutually different frequencies at which the intensity of the emitted electromagnetic radiation is varied, and to determine from the determined signal amplitudes the concentrations of the N mutually different gas types.

In Example 2, the subject matter of Example 1 can optionally further include that the modulation signal is at least partially strictly monotonically increasing and/or at least partially strictly monotonically decreasing.

In Example 3, the subject matter of Example 2 can optionally further include that the modulation signal is at least partially a sinusoidal signal, a triangle signal, or a sawtooth signal.

In Example 4, the subject matter of any one of Examples 1 to 3 can optionally further include that the modulation signal is at least partially a staircase signal.

In Example 5, the subject matter of any one of Examples 1 to 4 can optionally further include that the control unit is configured to determine the concentrations of the N mutually different gas types on the basis of an analytical expression of the form:

$$I(f)=1-\exp[(I_1+I_2+\ldots+I_N)f],$$

with f being the frequency at which the intensity of the electromagnetic radiation is varied, I being the amplitude of a signal from the acoustic-wave sensor, and $I_1$ to $I_N$ being signal components associated with the N mutually different gas types and indicative of the concentrations of the N mutually different gas types.

In Example 6, the subject matter of any one of Examples 1 to 5 can optionally further include a filter configured to selectively transmit electromagnetic radiation of a predetermined energy range emitted by the radiation source into the gas chamber. The predetermined energy range includes excitation energies of the molecules of each of the N gas types the concentrations of which in the gas chamber are to be determined.

In Example 7, the subject matter of Example 6 can optionally further include that the filter has fixed transmission characteristics.

In Example 8, the subject matter of any one of Examples 1 to 7 can optionally further include that the acoustic-wave sensor is positioned inside of the gas chamber or separated from the gas chamber by an acoustically transparent wall.

In Example 9, the subject matter of any one of Examples 1 to 7 can optionally further include that the acoustic-wave sensor is positioned inside of a reference-gas chamber gas-tightly separated from the gas chamber by a window transparent for electromagnetic radiation emitted by the radiation source.

In Example 10, the subject matter of any one of Examples 1 to 9 can optionally further include that the radiation source is configured as or includes at least one selected from: a photodiode, a laser, a black-body radiator, and a gray-body radiator.

In Example 11, the subject matter of claim 10 can optionally further include that the radiation source is configured as or includes a black-body radiator or a gray-body radiator configured as an electrically heatable body.

In Example 12, the subject matter of any one of Examples 1 to 11 can optionally further include that the gas chamber is delimited by a reflector configured to reflect electromagnetic radiation emitted by the radiation source.

In Example 13, the subject matter of Example 12 can optionally further include that the reflector has a reflectance of at least 20%, or of at least 50%, or of at least 80% in the infrared and/or visible and/or ultraviolet frequency range.

Example 14 is a mobile device including a photoacoustic gas analyzer of any one of Examples 1 to 13.

In Example 15, the mobile device of Example 14 can be configured as a mobile phone.

Example 16 is a method of operating a photoacoustic gas analyzer, the photoacoustic gas analyzer including: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, an acoustic-wave sensor configured to detect acoustic waves generated by the electromagnetic radiation emitted by the radiation source, and a control unit operatively connected to the radiation source and the acoustic-wave sensor. The control unit may be configured: to control the radiation source to emit electromagnetic radiation with a time-varying intensity and to modulate a frequency at which the intensity is varied with a modulation signal taking on at least N mutually different values, to receive from the acoustic-wave sensor signals indicative of detected acoustic waves generated by the electromagnetic radiation emitted by the radiation source, to determine at least N mutually different signal amplitudes associated with respective N mutually different frequencies at which the intensity of the emitted electromagnetic radiation is varied, and to determine from the determined signal amplitudes the concentrations of the N mutually different gas types. The method may include: controlling the radiation source to emit into the gas chamber electromagnetic radiation with a time-varying intensity and modulating the frequency at which the intensity is varied with a modulation signal taking on at least N mutually different values, receiving from the acoustic-wave sensor signals indicative of detected acoustic waves generated by the electromagnetic radiation emitted by the radiation source, determining at least N mutually different signal amplitudes associated with respective N mutually different frequencies at which the intensity of the emitted electromagnetic radiation is varied, and determining from the determined signal amplitudes the concentrations of the N mutually different gas types.

In Example 17, the method of Example 16 can optionally further include that the modulation signal is at least partially strictly monotonically increasing and/or at least partially strictly monotonically decreasing.

In Example 18, the subject matter of Example 17 can optionally further include that the modulation signal is at least partially a sinusoidal signal, a triangle signal, or a sawtooth signal.

In Example 19, the subject matter of any one of Examples 16 to 18 can optionally further include that the modulation signal is at least partially a staircase signal.

In Example 20, the subject matter of any one of Examples 16 to 19 can optionally further include that the determining the concentrations of the N mutually different gas types is performed on the basis of an analytical expression of the form:

$$I(f)=1-\exp[(I_1+I_2+\ldots+I_N)f],$$

with f being the frequency at which the intensity of the electromagnetic radiation is varied, I being the amplitude of a signal from the acoustic-wave sensor, and $I_1$ to $I_N$ being signal components originating from the N mutually different gas types and indicative of the concentrations of the N mutually different gas types.

Example 21 is a photoacoustic gas analyzer. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, the radiation source being operable in N mutually different modes, each mode being characterized by a unique emission spectrum different from the emission spectra of the other N−1 modes, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to operate the radiation source in the N mutually different modes in which the radiation source is respectively operated such as to emit electromagnetic radiation with a time-varying intensity, to receive in each mode from the acoustic-wave sensor signals indicative of detected acoustic waves generated by the electromagnetic radiation emitted by the radiation source into the gas to be analyzed, and to determine from the signals received in each mode the concentrations of the N mutually different gas types.

In Example 22, the subject matter of Example 21 can optionally further include that the radiation source is configured as a black-body radiator or a gray-body radiator. The control unit may be configured to intermittently heat the black-body radiator in each mode to a predetermined temperature associated with the respective mode in order to emit electromagnetic radiation with a time-varying intensity, the N predetermined temperatures associated with the N mutually different modes being mutually different.

In Example 23, the subject matter of Example 22 can optionally further include that the control unit is configured to calculate at an excitation energy of molecules of each of the N mutually different gas types the values of the Planck spectra emitted by the black-body radiator or the gray-body radiator in the N modes.

In Example 24, the subject matter of Example 23 can optionally further include that the control unit is configured to determine the concentrations of the N mutually different gas types on the basis of an expression of the form: $P_1(T_i)C_1+\ldots+P_N(T_i)C_N=I(T_i)$ with $P_1(T_i)$ to $P_N(T_i)$ being the values of a Planck spectrum at excitation energies of the molecules of the N mutually different gas types, the Planck spectrum being emitted by the black-body radiator or the gray-body radiator at a temperature $T_i$ in an i-th mode of the N mutually different modes, $I(T_i)$ being the integral signal detected by the acoustic wave sensor in the i-th mode, and $C_1$ to $C_N$ being the concentrations of the N mutually different gas types.

In Example 25, the subject matter of any one of Examples 21 to 24 can optionally further include a filter configured to selectively transmit electromagnetic radiation of a predetermined energy range emitted by the radiation source into the gas chamber. The predetermined energy range may include excitation energies of the molecules of each of the N gas types the concentrations of which in the gas chamber are to be determined.

In Example 26, the subject matter of Example 25 can optionally further include that the filter has fixed transmission characteristics.

In Example 27, the subject matter of any one of Examples 21 to 26 can optionally further include that the acoustic-wave sensor is positioned inside of the gas chamber or separated from the gas chamber by an acoustically transparent wall.

In Example 28, the subject matter of any one of Examples 21 to 26 can optionally further include that the acoustic-wave sensor is positioned inside of a reference-gas chamber gas-tightly separated from the gas chamber by a window transparent for electromagnetic radiation emitted by the radiation source.

In Example 29, the subject matter of any one of Examples 21 to 28 can optionally further include that the gas chamber is delimited by a reflector configured to reflect electromagnetic radiation emitted by the radiation source.

In Example 30, the subject matter of Example 29 can optionally further include that the reflector has a reflectance of at least 20%, or of at least 50%, or of at least 80% in the infrared and/or visible and/or ultraviolet frequency range.

Example 31 is a mobile device including a photoacoustic gas analyzer of any one of Examples 21 to 30.

In Example 32, the mobile device of Example 31 can be optionally configured as a mobile phone.

Example 33 is a method of operating a photoacoustic gas analyzer. The photoacoustic gas analyzer may include: a gas chamber configured to receive a gas to be analyzed therein, a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves, the radiation source being operable in N mutually different modes, each mode being characterized by a unique emission spectrum different from the emission spectra of the other N−1 modes, an acoustic-wave sensor configured to detect acoustic waves generated by the electromagnetic radiation emitted by the radiation source into the gas to be analyzed, and a control unit operatively connected to the radiation source and the acoustic-wave sensor. The control unit may be configured: to operate the radiation source in N mutually different modes in which the radiation source is operated such as to emit electromagnetic radiation with a time-varying intensity, to receive in each mode from the acoustic-wave sensor signals indicative of detected acoustic waves generated by the electromagnetic radiation emitted by the radiation source into the gas to be analyzed, and to determine from the signals received in each mode the concentrations of the N mutually different gas types. The method may include: operating the radiation source in the N mutually different modes such as to emit electromagnetic radiation with a time-varying intensity, receiving in each mode from the acoustic-wave sensor signals indicative of detected acoustic waves generated by the electromagnetic radiation emitted by the radiation source, and determining from the signals received in each mode the concentrations of the N mutually different gas types.

In Example 34, the subject matter of Example 33 can optionally further include that the radiation source is configured as a black-body radiator or a gray-body radiator. The control unit may be configured to intermittently heat the black-body radiator or the gray-body radiator in each mode to a predetermined temperature associated with the respective mode in order to emit electromagnetic radiation with a time-varying intensity, the N predetermined temperatures associated with the N mutually different modes being mutually different. The method may further include: intermittently heating the black-body radiator or the gray-body radiator in each mode to the predetermined temperature associated with the respective mode in order to emit electromagnetic radiation with a time-varying intensity.

In Example 35, the subject matter of Example 34 can optionally further include calculating at an excitation energy of the molecules of each of the N mutually different gas types the values of the Planck spectra emitted by the black-body radiator or the gray-body radiator in the N modes.

In Example 36, the subject matter of Example 35 can optionally further include that the determining the concentrations of the N mutually different gas types is performed on the basis of an expression of the form $P_1(T_i)C_1+ \ldots +P_N(T_i)C_N=I(T_i)$, with $P_1(T_i)$ to $P_N(T_i)$ being the values of a Planck spectrum at excitation energies of the molecules of the N mutually different gas types, the Planck spectrum being emitted by the black-body radiator at a temperature $T_i$ in an i-th mode of the N mutually different modes, $I(T_i)$ being the integral signal detected by the acoustic-wave sensor in the i-th mode, and $C_1$ to $C_N$ being the concentrations of the N mutually different gas types.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A photoacoustic gas analyzer, comprising:
a gas chamber configured to receive a gas to be analyzed therein; a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves;
an acoustic-wave sensor configured to detect acoustic waves generated by the electromagnetic radiation emitted by the radiation source into the gas to be analyzed; and
a control unit operatively connected to the radiation source and the acoustic-wave sensor, wherein the control unit is configured:
to control the radiation source to emit electromagnetic radiation with a time-varying intensity, wherein a frequency at which the time-varying intensity is varied is based on a modulation signal taking on at least N mutually different values;
to receive from the acoustic-wave sensor signals indicative of detected acoustic waves generated by the electromagnetic radiation emitted by the radiation source into the gas to be analyzed;
to determine at least N mutually different signal amplitudes associated with respective N mutually different values at which the time-varying intensity of the emitted electromagnetic radiation is varied, wherein the N mutually different values comprise N mutually different frequencies; and
to determine from the determined at least N mutually different signal amplitudes the concentrations of the N mutually different gas types,
wherein the control unit is configured to determine the concentrations of the N mutually different gas types based on the at least N mutually different signal amplitudes, each signal amplitude associated with one of the respective N mutually different frequencies at which the time-varying intensity of the emitted electromagnetic radiation is varied, and each signal amplitude comprising signal components, $I_1$ to $I_N$, associated with the N mutually different gas types and indicative of the respective proportional concentrations of the N mutually different gas types, and further based on proportionality factors, wherein the proportionality factors correspond to the N mutually different gas types, the proportionality factors determined based on calibrations using samples with known concentrations of the N mutually different gas types.

2. The photoacoustic gas analyzer of claim 1,
wherein the modulation signal is at least partially strictly monotonically increasing and/or at least partially strictly monotonically decreasing.

3. The photoacoustic gas analyzer of claim 2,
wherein the modulation signal is at least partially a sinusoidal signal, a triangle signal, or a sawtooth signal.

4. The photoacoustic gas analyzer of claim 1,
wherein the modulation signal is at least partially a staircase signal.

5. The photoacoustic gas analyzer of claim 1,
further comprising a filter configured to selectively transmit electromagnetic radiation of a predetermined energy range emitted by the radiation source into the gas chamber, wherein the predetermined energy range comprises excitation energies of the molecules of each of the N gas types the concentrations of which in the gas chamber are to be determined.

6. The photoacoustic gas analyzer of claim 5,
wherein the filter has fixed transmission characteristics.

7. The photoacoustic gas analyzer of claim 1,
wherein the acoustic-wave sensor is positioned inside of the gas chamber.

8. The photoacoustic gas analyzer of claim 1,
wherein the acoustic-wave sensor is positioned inside of a reference-gas chamber gas-tightly separated from the gas chamber by a window transparent for electromagnetic radiation emitted by the radiation source.

9. The photoacoustic gas analyzer of claim 1,
wherein the radiation source is configured as or comprises at least one selected from: a photodiode, a laser, a black-body radiator, and a gray-body radiator.

10. The photoacoustic gas analyzer of claim 9,
wherein the radiation source is configured as or comprises a black-body radiator or a gray-body radiator configured as an electrically heatable body.

11. The photoacoustic gas analyzer of claim 1,
wherein the gas chamber is delimited by a reflector configured to reflect electromagnetic radiation emitted by the radiation source.

12. The photoacoustic gas analyzer of claim 1,
wherein the control unit is further configured:
to determine a set of local maximums of each of the acoustic-wave sensor signals;
to determine the N mutually different signal amplitudes based on the set of local maximums of each of the acoustic-wave sensor signals and corresponding timings of the set of local maximums;
to assign the N mutually different signal amplitudes to a respective one of the N mutually different frequencies; and
to determine partial amplitudes $I_1$ to $I_N$ associated with the N mutually different gas types and indicative of the concentrations of the N mutually different gas types for each of the N mutually different signal amplitudes.

13. The photoacoustic gas analyzer of claim 12,
wherein the frequency at which the time-varying intensity of the electromagnetic radiation is varied is a function of time.

14. The photoacoustic gas analyzer of claim 12,
wherein the modulation signal has a linear relationship between frequency and time.

15. A method of operating a photoacoustic gas analyzer, wherein the photoacoustic gas analyzer comprises:
a gas chamber configured to receive a gas to be analyzed therein,
a radiation source configured to emit into the gas chamber electromagnetic radiation with a time-varying intensity adapted to selectively excite gas molecules of N mutually different gas types the concentrations of which are to be determined in the gas received in the gas chamber, thereby generating acoustic waves;
an acoustic-wave sensor configured to detect acoustic waves generated by the electromagnetic radiation emitted by the radiation source into the gas to be analyzed; and
a control unit operatively connected to the radiation source and the acoustic-wave sensor, wherein the control unit is configured:
to control the radiation source to emit electromagnetic radiation with a time-varying intensity, wherein a frequency at which the time-varying intensity is varied is based on a modulation signal taking on at least N mutually different values;
to receive from the acoustic-wave sensor signals indicative of detected acoustic waves generated by the electromagnetic radiation emitted by the radiation source into the gas to be analyzed;
to determine at least N mutually different signal amplitudes associated with respective N mutually different frequencies at which the time-varying intensity of the emitted electromagnetic radiation is varied; and
to determine from the determined signal amplitudes the concentrations of the N mutually different gas types,
wherein the method comprises:
controlling the radiation source to emit into the gas chamber electromagnetic radiation with a time-varying intensity, wherein the frequency at which the time-varying intensity is varied is modulated with the modulation signal;
receiving from the acoustic-wave sensor signals indicative of detected acoustic waves generated by the electromagnetic radiation emitted by the radiation source into the gas to be analyzed;
determining at least N mutually different signal amplitudes associated with respective N mutually different values at which the time-varying intensity of the emitted electromagnetic radiation is varied, wherein the N mutually different values comprise N mutually different frequencies; and determining from the determined at least N mutually different signal amplitudes the concentrations of the N mutually different gas types,
wherein the concentrations of the N mutually different gas types is determined based on the at least N mutually different signal amplitudes, each signal amplitude associated with one of the respective N mutually different frequencies at which the time-varying intensity of the emitted electromagnetic radiation is varied, and each signal amplitude comprising signal components, $I_1$ to $I_N$, associated with the N mutually different gas types and indicative of the respective proportional concentrations of the N mutually different gas types, and further based on proportionality factors, wherein the proportionality factors correspond to the N mutually different gas types, the proportionality factors determined based on calibrations using samples with known concentrations of the N mutually different gas types at the N mutually different frequencies and the at least N mutually different signal amplitudes.

16. The method of claim 15,
wherein the modulation signal is at least partially strictly monotonically increasing and/or at least partially strictly monotonically decreasing.

17. The method of claim 16,
wherein the modulation signal is at least partially a sinusoidal signal, a triangle signal, or a sawtooth signal.

18. The method of claim 15,
wherein the modulation signal is at least partially a staircase signal.

19. The method of claim 15, further comprising:
determining a set of local maximums of each of the acoustic-wave sensor signals;
determining the N mutually different signal amplitudes based on the set of local maximums of each of the acoustic-wave sensor signals and corresponding timings of the set of local maximums;
assigning the N mutually different signal amplitudes to a respective one of the N mutually different frequencies; and
determining partial amplitudes $I_1$ to $I_N$ associated with the N mutually different gas types and indicative of the concentrations of the N mutually different gas types for each of the N mutually different signal amplitudes.

20. The method of claim 19,
wherein the frequency at which the time-varying intensity of the electromagnetic radiation is varied is a function of time.

21. The method of claim 19,
wherein the modulation signal has a linear relationship between frequency and time.

* * * * *